United States Patent
Herold

(10) Patent No.: US 9,981,609 B2
(45) Date of Patent: May 29, 2018

(54) ROTATING LUGGAGE BIN

(71) Applicant: The Boeing Company, Chicago, IL (US)

(72) Inventor: William F. Herold, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 1193 days.

(21) Appl. No.: 13/743,044

(22) Filed: Jan. 16, 2013

(65) Prior Publication Data
US 2014/0197723 A1    Jul. 17, 2014

(51) Int. Cl.
*B60R 5/00* (2006.01)
*B64D 11/00* (2006.01)

(52) U.S. Cl.
CPC ............ *B60R 5/003* (2013.01); *B64D 11/003* (2013.01); *Y02T 50/46* (2013.01)

(58) Field of Classification Search
USPC ...................................... 244/118.5
See application file for complete search history.

(56) References Cited

U.S. PATENT DOCUMENTS

| | | | |
|---|---|---|---|
| 4,275,942 A * | 6/1981 | Steidl | 312/266 |
| 5,456,529 A | 10/1995 | Cheung | |
| 5,839,694 A | 11/1998 | Bargull et al. | |
| 5,934,615 A * | 8/1999 | Treichler et al. | 244/118.5 |
| 6,045,204 A * | 4/2000 | Frazier et al. | 312/247 |
| 6,484,969 B2 | 11/2002 | Sprenger et al. | |
| 6,691,951 B2 | 2/2004 | Frazier | |
| 7,234,666 B2 * | 6/2007 | Novak et al. | 244/118.5 |
| 7,832,685 B2 | 11/2010 | Haynes | |
| 7,887,008 B2 * | 2/2011 | Lamoree et al. | 244/118.1 |
| 7,934,678 B2 | 5/2011 | Von Wieding et al. | |
| 7,988,091 B2 | 8/2011 | Von Wieding et al. | |
| 8,028,957 B2 * | 10/2011 | Wolf et al. | 244/118.5 |
| 8,047,468 B2 | 11/2011 | Schmitz et al. | |
| 8,262,022 B2 * | 9/2012 | Young et al. | 244/118.5 |
| 8,622,344 B2 | 1/2014 | Vine et al. | |
| 2007/0095981 A1 * | 5/2007 | Bock | 244/118.1 |
| 2009/0121080 A1 * | 5/2009 | Feldkirchner et al. | 244/118.5 |
| 2012/0038253 A1 | 2/2012 | Rafler et al. | |
| 2012/0038254 A1 | 2/2012 | Rafler et al. | |
| 2012/0248246 A1 | 10/2012 | Savian | |

FOREIGN PATENT DOCUMENTS

DE    102008049639 A1    4/2010

OTHER PUBLICATIONS

International Search Report and Written Opinion, dated Mar. 4, 2014, regarding Application No. PCT/US2013/073995, 11 pages.
International Search Report and Written Opinion, dated Jul. 21, 2015, regarding Application No. PCT/US2013/073995, 7 pages.

* cited by examiner

*Primary Examiner* — Timothy D Collins
*Assistant Examiner* — Keith L Dixon
(74) *Attorney, Agent, or Firm* — Yee & Associates, P.C.

(57) ABSTRACT

An apparatus comprising a structure having a cavity with an opening configured to receive a piece of baggage and a flange configured to retain the piece of baggage when the structure is in an open state, wherein the structure is configured to move between the open state and a closed state about an axis of rotation for the structure, and wherein the opening has a horizontal position when the structure is in the closed state and the opening has a vertical position when the structure is in the open state.

14 Claims, 13 Drawing Sheets

ROTATING LUGGAGE BIN

BACKGROUND INFORMATION

1. Field

The present disclosure relates generally to storage of items, and in particular, to storage of luggage. Still more particularly, the present disclosure relates to an apparatus for storing luggage in an aircraft.

2. Background

In commercial aviation, passengers may bring carryon items, such as luggage into the passenger cabin. Luggage may be stored within a passenger cabin in storage areas. Storage areas in the passenger cabin include areas on the floor underneath the passenger seats and overhead compartments.

An overhead compartment may receive luggage when the overhead compartment is in an open state or open position. After luggage is placed into an overhead compartment, the overhead compartment may be placed into a closed state.

Many designs for overhead compartments exist. Some overhead compartment designs include a stationary luggage bin and a rotating door. Other overhead compartment designs include a rotating luggage bin. Yet other overhead compartment designs feature a luggage bin which is lowered into the passenger cabin.

One design of a rotating luggage bin is a C-shaped luggage bin. Roller upright luggage may be placed in a C-shaped bin in an open position with "wheels to the back" or with wheels to the side.

A C-shaped luggage bin rotates about an axis of rotation. The axis of rotation is positioned to prevent an unsafe dump angle. An unsafe dump angle may cause luggage to fall from the C-shaped luggage bin when the overhead compartment is in an open state.

Therefore, it would be desirable to have a method and apparatus that takes into account at least some of the issues discussed above, as well as other possible issues.

SUMMARY

In one illustrative embodiment, an apparatus is presented. The apparatus comprises a structure having a cavity with an opening configured to receive a piece of baggage and a flange configured to retain the piece of baggage when the structure is in an open state. The structure is configured to move between the open state and a closed state about an axis of rotation for the structure. The opening has a horizontal position when the structure is in the closed state, and the opening has a vertical position when the structure is in the open state.

In another illustrative embodiment, an apparatus is presented. The apparatus comprises a structure configured to rotate about an axis of rotation between an open position and a closed position. The structure is further configured to receive a roller upright in a substantially upright position when the structure is in the open position.

In yet another illustrative embodiment, an apparatus is presented. The apparatus comprises a structure having a cavity with an opening, a flange configured to retain a roller upright when the structure is in an open state, and a J-shaped cross-section. The structure is configured to move between an open state and a closed state about an axis of rotation for the structure. The structure is further configured to receive the roller upright through the opening such that the roller is in a substantially upright position when the structure is in the open state.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that considerations in the design of overhead compartments include passenger safety, passenger comfort, and weight. The illustrative embodiments recognize that the design of a luggage bin may improve the comfort and ease of using the luggage bin. For example, the opening of the luggage bin may have a threshold which is a desirable height for inserting luggage. As another example, the different illustrative embodiments recognize the axis of rotation of a luggage bin may be positioned to require a desirable amount of force to close the luggage bin. The illustrative embodiments also recognize and take into account that the size of the luggage bins may be increased based on the location of the axis of rotation.

The illustrative embodiments also recognize and take into account that downtime for repair of parts may be costly. Accordingly, the illustrative embodiments recognize that a reliable luggage bin is desirable. Additionally, the illustrative embodiments recognize that additional weight on aircraft is undesirable.

Thus, the different illustrative embodiments provide an apparatus for receiving and storing items. In particular, the different illustrative embodiments provide an apparatus for receiving and storing items without increasing at least one of the weight, cost, and a complexity of the overhead compartment more than desired.

Figure 1:
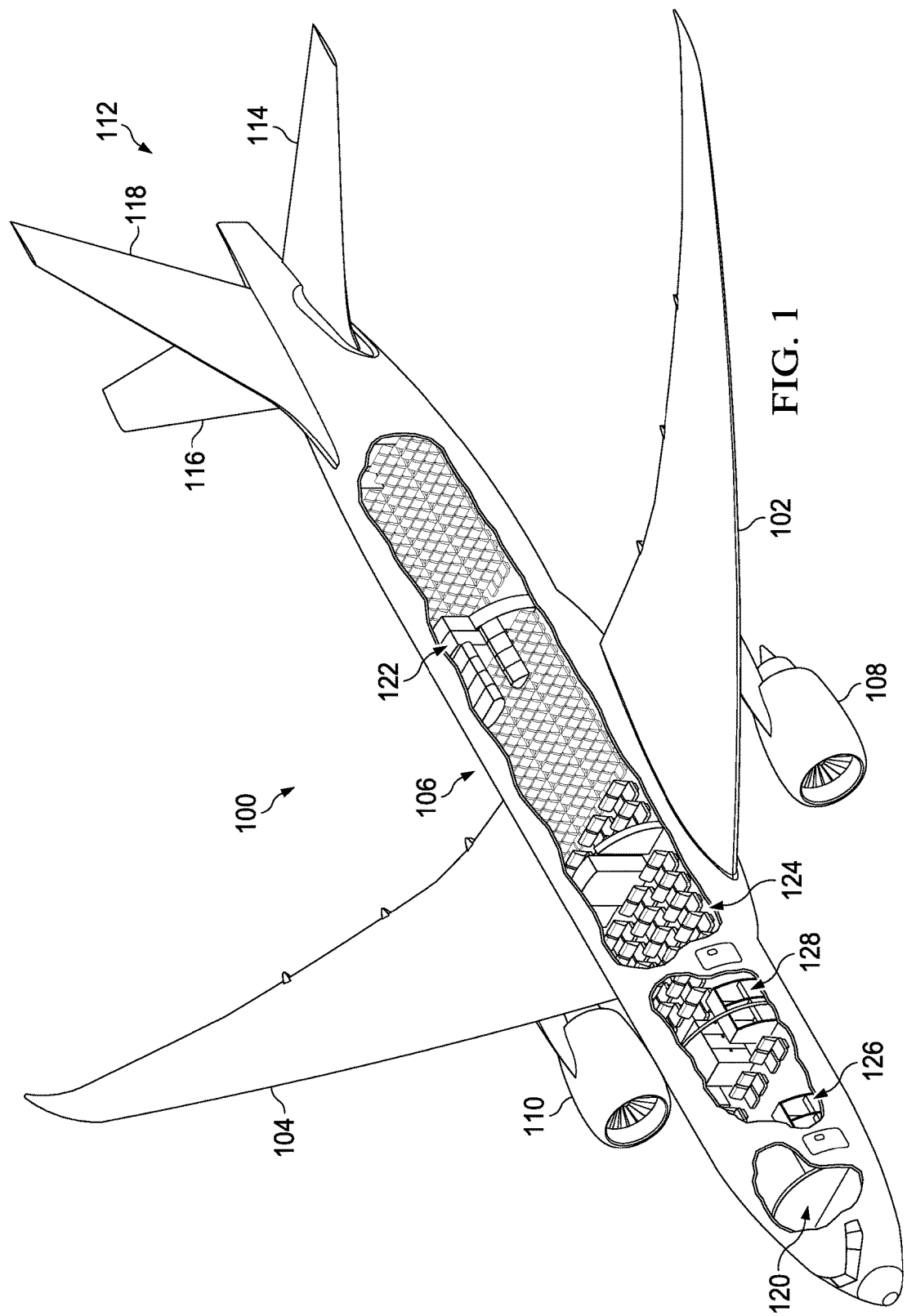
FIG. 1 is an illustration of an aircraft in which an illustrative embodiment may be implemented.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Body 106 also has cockpit 120 and passenger cabin 122. In this example, passenger cabin 122 may include passenger seating in seating area 124. Passenger seating may include a number of aircraft seats. As used herein, a "number of" items means one or more items. For example, a number of aircraft seats means one or more aircraft seats.

Further, seating area 124 in passenger cabin 122 may also include storage areas, such as a number of overhead compartments. Passenger cabin 122 also may include lavatory 126 and galley area 128. These two areas may be partitioned or separated from seating area 124 by a partitioning structure such as, for example, without limitation, a wall.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft. Also, other areas may be present in addition to seating area 124, lavatory 126, and galley area 128. Other areas may include, for example, without limitation, closets, storage areas, lounges, and other suitable areas for passenger seating. As another example, airplane seats within seating area 124 may be arranged differently from the depicted example. In other illustrative embodiments, some seats may be grouped into sets of single seats instead of three seats or pairs of seats as is illustrated in seating area 124.

Figure 2:
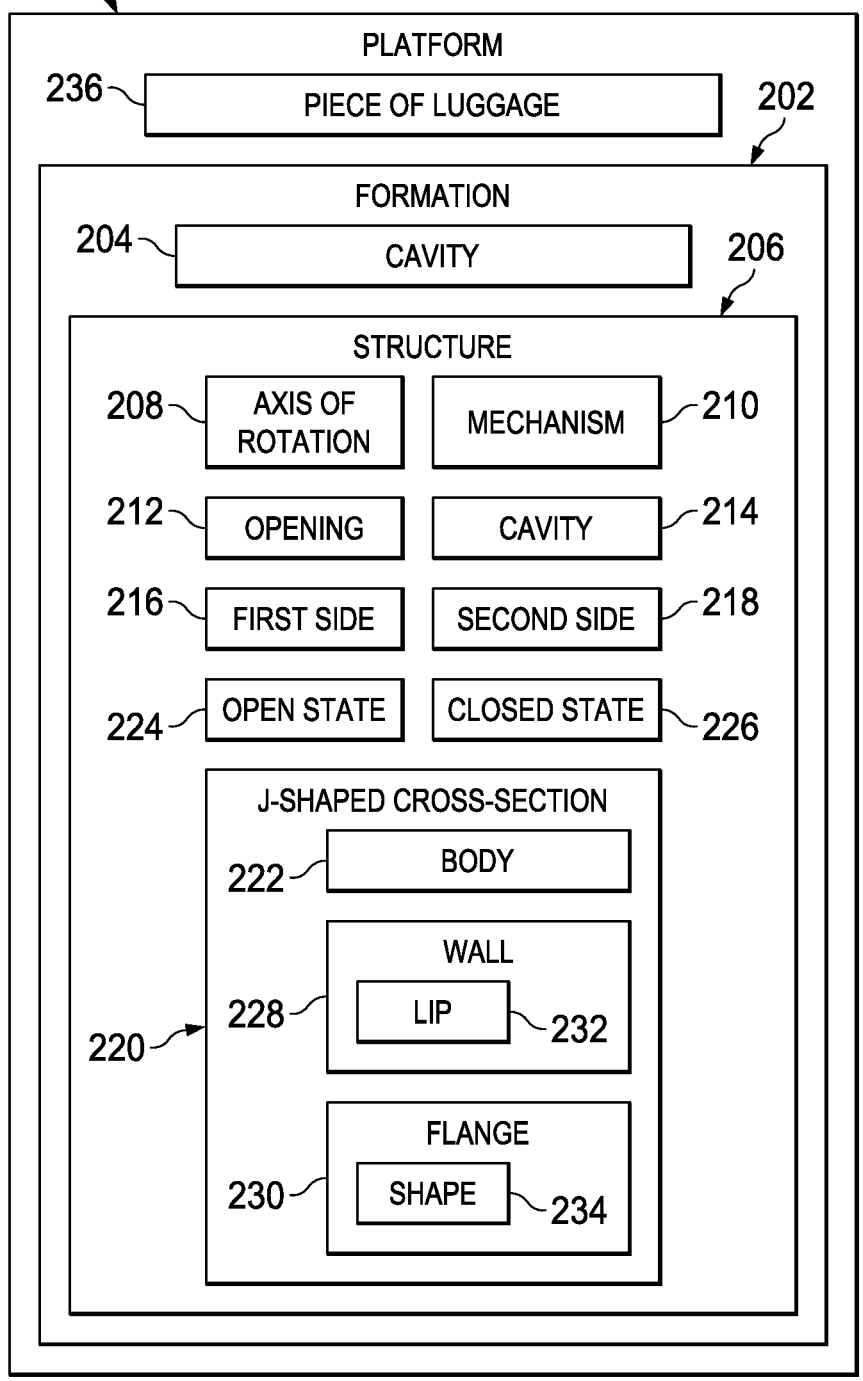
FIG. 2 is an illustration of a block diagram of a vehicle environment in accordance with an illustrative embodiment.

With reference now to FIG. 2, an illustration of a block diagram of a vehicle environment is depicted in accordance with an illustrative embodiment. In FIG. 2, platform 200 may be one implementation of the aircraft 100 in FIG. 1. Although the illustrative examples for an illustrative embodiment are described with respect to an aircraft, an illustrative embodiment may be applied to other types of platforms. Platform 200 may be, for example, a mobile platform, a stationary platform, a land-based structure, an aquatic-based structure, and a space-based structure. More specifically, platform 200, may be a surface ship, a tank, a personnel carrier, a train, a spacecraft, a submarine, an automobile, a house, a manufacturing facility, a building, and other suitable platforms.

As depicted, platform 200 has formation 202 with cavity 204. Formation 202 is a surface configured to support structure 206. Formation 202 may be, for example, a ceiling, a shelf, or any other surface elevated above the floor of platform 200. In one illustrative example, formation 202 may be a center compartment in the ceiling of an aircraft. In another illustrative example, formation 202 may be a wall of a bus station.

Cavity 204 of formation 202 is configured to receive structure 206. Cavity 204 of formation 202 is further configured to allow rotation of structure 206 within cavity 204.

As depicted, structure 206 has axis of rotation 208, mechanism 210, opening 212, cavity 214, first side 216, second side 218, and J-shaped cross-section 220. In one illustrative example, structure 206 may be constructed by associating components with each other. For example, first side 216, second side 218, and J-shaped cross-section 220 may be separate associated components. In another illustrative example, structure 206 may comprise a single unitary body.

Structure 206 is configured to rotate about axis of rotation 208 in cavity 204. Rotation of structure 206 about axis of rotation 208 allows structure 206 to transition from open state 224 to closed state 226. Likewise, rotation of structure 206 about axis of rotation 208 allows structure 206 to transition from closed state 226 to open state 224.

Axis of rotation 208 may be configured to provide desirable characteristics in rotation. In one illustrative example, axis of rotation 208 is located relative to a volume center of gravity of structure 206. In this illustrative example, axis of rotation 208 is located to require a force for moving structure 206 to closed state 226 to have a desired level. For example, axis of rotation 208 may be selected to reduce force as much as possible or to a level that allows a human operator to move structure 206 to closed state 226 with as little force as possible. In some illustrative examples, axis of rotation 208 is located relative to an anticipated center of gravity of luggage placed within structure 206. In one illustrative example, axis of rotation 208 is located relative to the center of gravity along the length of a piece of luggage with uniform weight distribution placed within structure 206. In one illustrative example, this piece of luggage may be a roller upright luggage in an upright or nearly position within structure 206, as described further below. In one illustrative example, axis of rotation 208 may be located based on a roller upright luggage standard in an upright position. The standard may be exemplary dimensions of a roller upright luggage. The dimensions of the standard may range from 8 to 13 inches in depth, from 12 to 18 inches in width, and from 20 to 26 inches in height. In one illustrative example, the dimensions of the standard may be 12 inches by 16 inches by 25 inches.

Mechanism 210 is configured to allow rotation of structure 206 with a desirable degree of rotation. Mechanism 210 may prevent structure 206 from rotating farther than a desirable degree of rotation. The desirable degree of rotation may allow use of structure 206 without unsafe dump angles. In one illustrative example, mechanism 210 may allow rotation of structure 206 within the range of 60 to 120 degrees.

In one illustrative example, mechanism 210 may allow rotation of structure 206 to a desirable degree of rotation of 80 degrees. In another illustrative example, mechanism 210 may allow rotation of structure 206 to a desirable degree of rotation of 105 degrees. The desirable degree of rotation of structure 206 may be based on design considerations in platform 200. In one illustrative example, the desirable degree of rotation of structure 206 may be based on at least one of the location of structure 206 in platform 200, a desired angle of structure 206 relative to platform 200 in closed state 226, a desired threshold for opening 212 of structure 206 in open state 224, or other suitable design considerations.

Mechanism 210 may take the form of any suitable mechanism to allow structure 206 to rotate within a desirable degree of rotation. In one illustrative example, mechanism 210 may be a hydraulic arm. In other illustrative examples, mechanism 210 may cause the rotation of structure 206. In one illustrative example, mechanism 210 may be an actuator.

Structure 206 is configured to receive items in open state 224. Structure 206 may receive items through opening 212 into cavity 214. In open state 224, opening 212 may be facing away from cavity 204 of formation 202. In closed state 226, opening 212 may be facing towards cavity 204 of formation 202.

Cavity 214 of structure 206 may be accessible through opening 212 in open state 224. Access to cavity 214 through opening 212 may be restricted by formation 202 when structure 206 is in closed state 226.

When structure 206 is in open state 224, opening 212 is in a vertical position. In the vertical position, the plane of opening 212 may be perpendicular or nearly perpendicular with the floor of platform 200. When structure 206 is in closed state 226, opening 212 is in a horizontal position. In the horizontal position, the plane of opening 212 may be parallel or nearly parallel with the floor of platform 200.

Cavity 214 of structure 206 is configured to hold items. Items may include at least one of bags, parcels, boxes, luggage, and other types of items. As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

In some illustrative examples, cavity 214 of structure 206 is configured to hold luggage. As used herein, the terms luggage and baggage may be used interchangeably. In one illustrative example, cavity 214 is configured to hold roller upright luggage. Roller upright luggage may also be referred to as wheeled upright, rolling upright, or upright rolling luggage. As used herein, a piece of roller upright luggage may be referred to as a roller upright. Roller upright luggage may include two or four wheels associated with a smallest face, or base, of the luggage. When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

The wheels of the roller upright luggage allow the roller upright luggage to rest with the longest dimension perpendicular or substantially perpendicular to the surface upon which the roller upright luggage is resting. As used herein, this position may be referred to as upright. Roller upright luggage may be transported by pulling or pushing the luggage so that the luggage rolls on the wheels either in an upright or inclined position. Rolling a roller upright luggage in an upright position may include rolling the luggage on four wheels, allowing the longest dimension to remain perpendicular or substantially perpendicular to the surface upon which the roller upright luggage is rolling. An inclined position may be one in which at least one wheel associated with the base contacts the surface, but the longest dimension of the roller upright luggage is not perpendicular to the surface.

Roller upright luggage rests in a horizontal position when the longest dimension of the roller upright luggage is parallel or substantially parallel to the surface upon which the roller upright luggage is resting. When in a horizontal position, the wheels of the roller upright luggage do not contact the surface upon which the roller upright luggage is resting. The phrases "wheels to the back" or "wheels to the side," may be used to specify the direction the roller upright luggage is facing when the roller upright luggage is in a horizontal position.

In one illustrative example, cavity 214 of structure 206 is configured to hold roller upright luggage. In this illustrative example, cavity 214 may be configured to receive roller upright luggage in an upright position. In other illustrative examples, cavity 214 may be configured to receive roller upright luggage in an inclined position. Cavity 214 may be configured to hold roller upright luggage as a result of the size, shape, or other suitable characteristic of cavity 214. As depicted, structure 206 also has J-shaped cross-section 220. J-shaped cross-section 220 has body 222, wall 228, and flange 230. Body 222, wall 228, and flange 230 may be configured to hold, accommodate, retain, or restrain items within cavity 214.

As depicted, wall 228 has lip 232. Lip 232 may be configured to inhibit items such as luggage from falling from cavity 214 when structure 206 is in open state 224. Lip 232 may be configured to inhibit items from falling from cavity 214 by its length, angle relative to wall 228, shape, or other suitable characteristic. In one illustrative example, lip 232 is configured to cause a height of opening 212 to be smaller than a height of cavity 214. In this illustrative example, piece of luggage 236 may be inside cavity 214. In this illustrative example, piece of luggage 236 inside cavity 214 and falling towards opening 212 may impact lip 232. Lip 232 may stop the piece of luggage 236 from falling and retain piece of luggage 236 within cavity 214.

As depicted, flange 230 has shape 234. Shape 234 may be configured to deter movement of items within cavity 214 when structure 206 is in open state 224. In one illustrative example, shape 234 is configured to engage at least a portion of a number of features of piece of luggage 236. In this illustrative example, piece of luggage 236 has the number of features on a side resting on flange 230 when piece of luggage 236 is located in cavity 214. In this illustrative example, shape 234 is configured to engage at least a portion of the number of features of piece of luggage 236. In one illustrative example, these features might include wheels and feet. In this illustrative example, shape 234 of flange 230 may be configured to engage at least one of the wheels and feet. In one illustrative example, shape 234 may include a wheel chock to engage the wheels of piece of luggage 236.

Flange 230 may also be configured to retain piece of luggage 236 in structure 206 while structure 206 is in open state 224. Flange 230 may be configured to retain piece of luggage 236 in structure 206 by its size, shape 234, angle relative to body 222, or other suitable characteristics. In one illustrative example, flange 230 is positioned at an angle relative to body 222. In this illustrative example, flange 230 encourages piece of luggage 236 to lean against body 222 when structure 206 is in open state 224. In another illustrative example, features of shape 234 configured to engage features of piece of luggage 236 may retain piece of luggage 236.

The illustration of platform 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, structure 206 may not have J-shaped cross-section 220. In this illustrative example, structure 206 may still have body 222, wall 228, and flange 230. In another illustrative example, wall 228 may not have lip 232. In yet another illustrative example, formation 202 may limit rotation of structure 206. As a result, structure 206 may not have mechanism 210.

Figure 3:
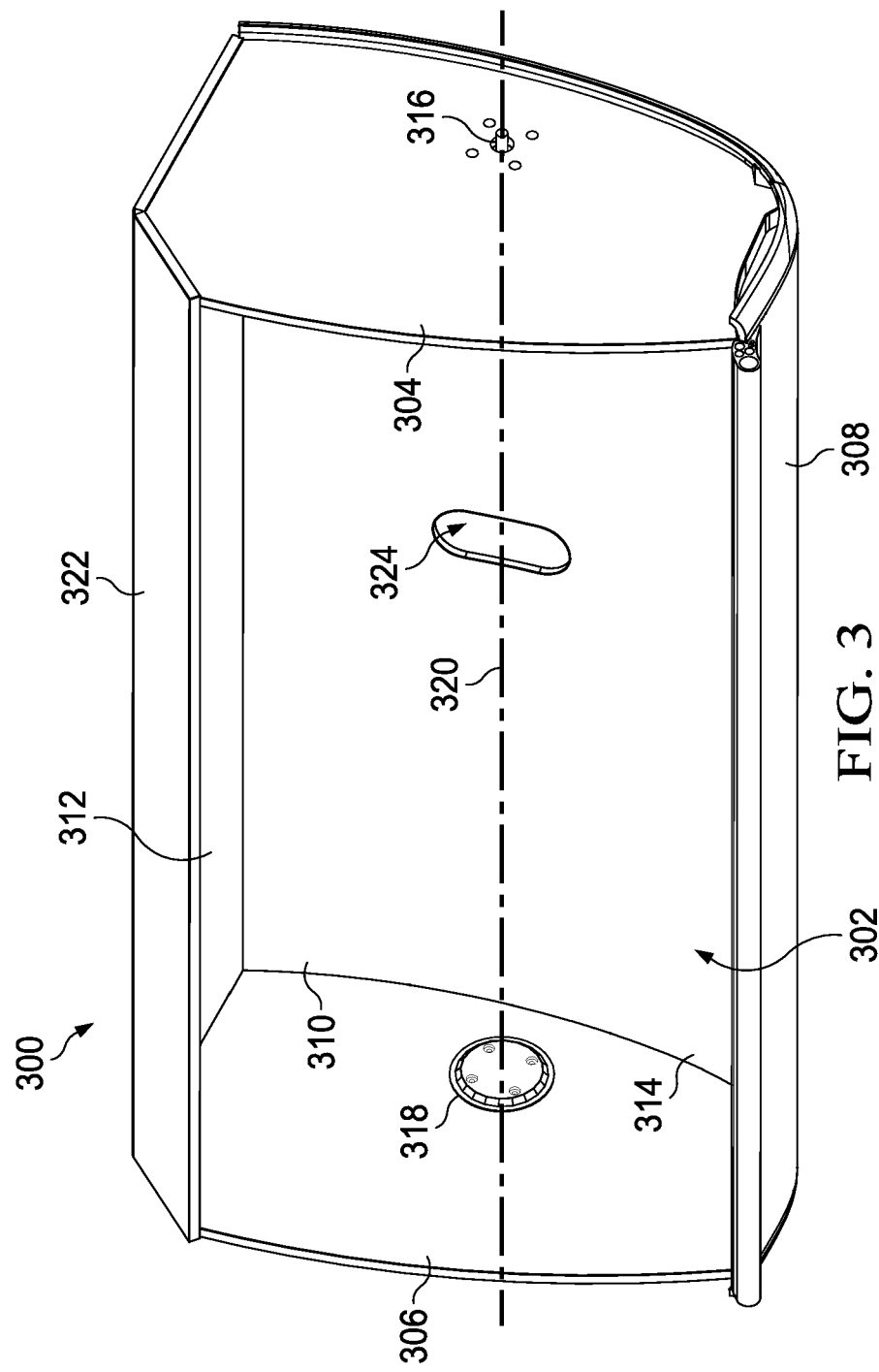
FIG. 3 is an illustration of a structure in accordance with an illustrative embodiment.

With reference now to FIG. 3, an illustration of a structure is depicted in accordance with an illustrative embodiment. As depicted structure 300 is an example of a physical implementation of structure 206 shown in block form in FIG. 2. As depicted structure 300 may be used as a luggage bin in an aircraft such as aircraft 100 of FIG. 1.

As depicted, structure 300 has cavity 302. Cavity 302 is bounded by first side 304, second side 306, flange 308, body 310, wall 312, and opening 314.

First side 304 has pivot point 316. Second side 306 has pivot point 318. Axis of rotation 320 may be drawn through pivot point 316 and pivot point 318. Structure 300 may rotate about axis of rotation 320 using pivot point 316 and pivot point 318.

In one illustrative example, axis of rotation 320 may be positioned in the center of gravity of structure 300. In another illustrative example, axis of rotation 320 may be positioned in an estimated center of gravity of items held in structure 300.

The position of axis of rotation 320 influences the amount of force needed to put structure 300 in a closed state. In one illustrative example, axis of rotation 320 is at or near the expected center of gravity for roller upright luggage held in structure 300. In this illustrative example, if axis of rotation 320 were moved towards wall 312, the amount of force needed to put structure 300 in a closed state would increase.

The position of axis of rotation 320 may also influence the distance between first side 304 and second side 306. For example, in one illustrative example, axis of rotation 320 is at or near the expected center of gravity for items held in structure 300. In this illustrative example, items placed in structure 300 will increase the force needed to put structure 300 in a closed state at a slower rate than the same items placed into structure 300 if axis of rotation 320 were closer towards wall 312. As a result, structure 300 may have a longer distance between first side 304 and second side 306 than a conventional overhead compartment. Likewise, structure 300 may have a longer distance between first side 304 and second side 306 than a structure with an axis of rotation closer to the back wall. This longer distance may accommodate more or larger items. As a result, this longer distance may also increase the weight held in structure 300. However, because of the position of axis of rotation 320, the distance between first side 304 and second side 306 may be increased without undesirable increases of the force needed to place structure 300 in a closed position.

Opening 314 is bordered by first side 304, second side 306, flange 308, and wall 312. Specifically, as depicted, opening 314 is bordered on one side by lip 322 of wall 312. Opening 314 is configured to receive items when structure 300 is in an open state.

Opposite opening 314, body 310 is also bordered by first side 304, second side 306, flange 308, and wall 312. Body 310 is configured to support items within cavity 302 when structure 300 is in a closed state.

As depicted, body 310 has feature 324. Feature 324 is a cutout or portion of body 310 without material. Feature 324 may be configured to aid in rotation of structure 300. Feature 324 may also be configured so that a desired strength or other desired characteristics of structure 300 are maintained. Feature 324 may reduce the overall weight of structure 300.

As depicted, feature 324 is in the center of the longest axis of structure 300. However, in other illustrative examples, feature 324 may be present in other locations in body 310. Additionally, although as depicted, feature 324 comprises one cutout, in other illustrative examples, feature 324 may comprise more than one cutout. In other illustrative examples, feature 324 may not be present in structure 300.

Figure 4:
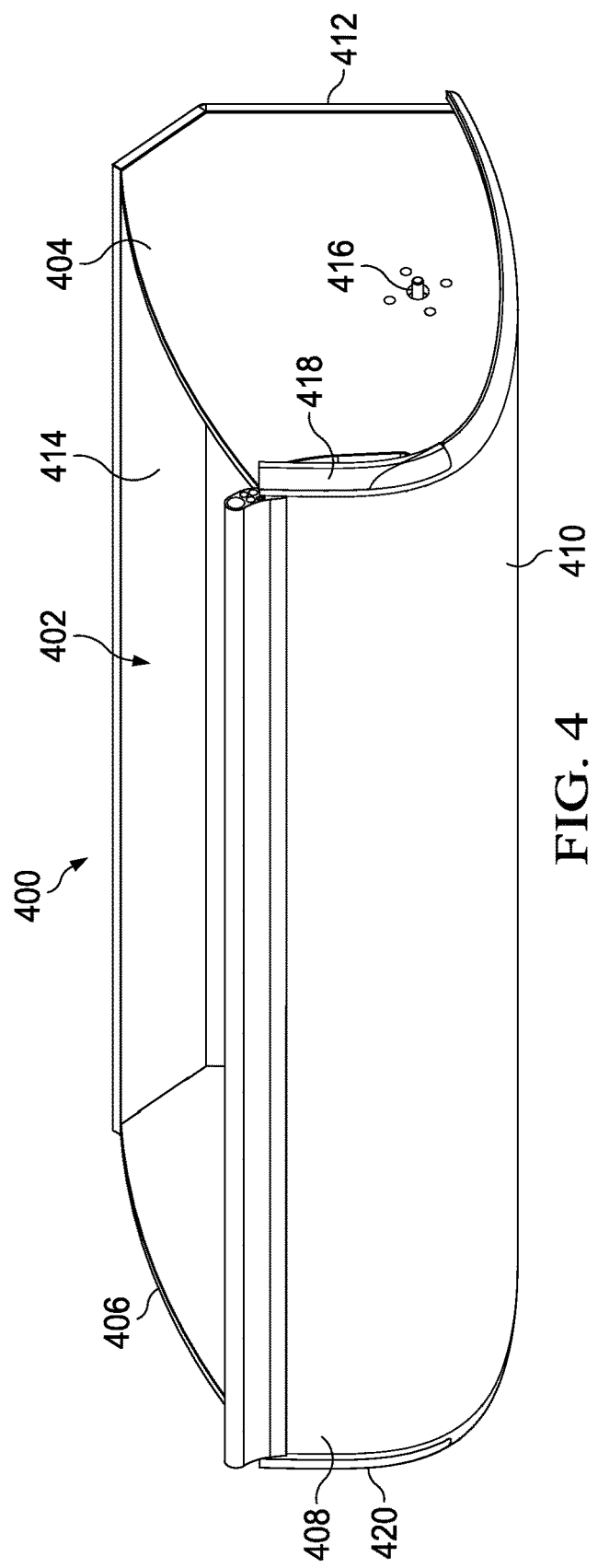
FIG. 4 is another illustration of a structure in accordance with an illustrative embodiment.

Turning now to FIG. 4, an illustration of a structure is depicted in accordance with an illustrative embodiment. As depicted, structure 400 is an example of a physical implementation of structure 206 shown in block form in FIG. 2 and an alternate view of structure 300 of FIG. 3.

As depicted, structure 400 has cavity 402. Cavity 402 is bounded by first side 404, second side 406, flange 408, body 410, wall 412, and opening 414. As depicted, first side 404 has pivot point 416. Structure 400 may rotate about an axis of rotation drawn through pivot point 416.

Beginning at the intersection of first side 404 and flange 408, structure 400 has rim 418. Rim 418 continues through the intersection of first side 404 and body 410, and stops at the intersection of first side 404 and wall 412. Rim 418 is associated with first side 404. Likewise, rim 420 is associated with second side 406.

Rim 418 and rim 420 may be considered aesthetic features of structure 400. Rim 418 and rim 420 may create a seamless or aesthetically pleasing look by covering portions of a cavity in which structure 400 resides. Rim 418 and rim 420 may also be considered safety features of structure 400. By covering portions of a cavity in which structure 400 resides, rim 418 and rim 420 may prevent items including jewelry, fingers, portions of luggage, and other items from being placed or lodged between structure 400 and the cavity in which structure 400 resides.

Figure 5:
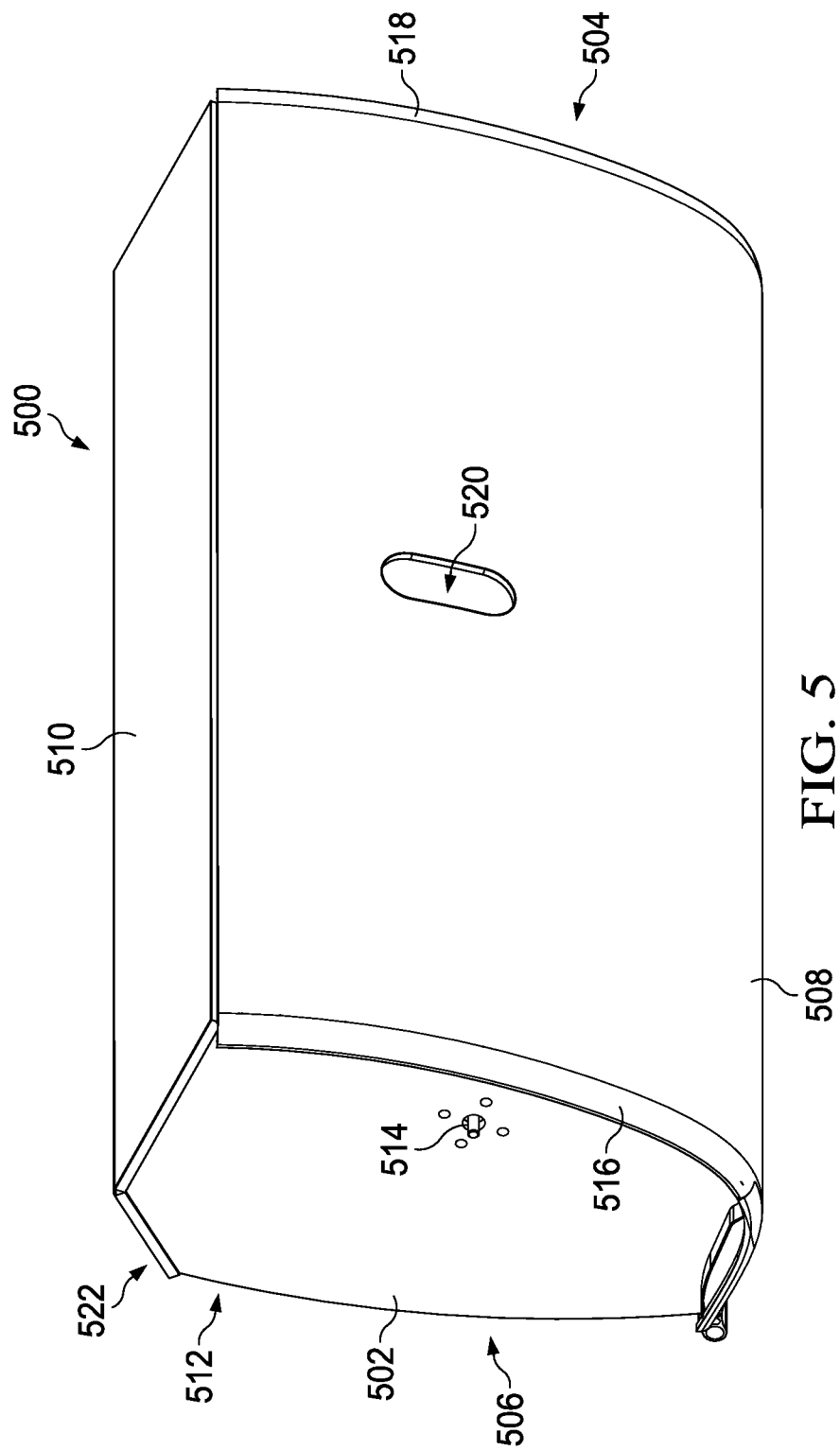
FIG. 5 is still another illustration of a structure in accordance with an illustrative embodiment.

With reference now to FIG. 5, an illustration of a structure is depicted in accordance with an illustrative embodiment. As depicted, structure 500 is an example of a physical implementation of structure 206 shown in block form in FIG. 2 and an alternate view of structure 300 of FIG. 3.

As depicted, structure 500 has first side 502, second side 504, flange 506, body 508, wall 510, and opening 512. As depicted, first side 502 has pivot point 514. Structure 500 may rotate about an axis of rotation drawn through pivot point 514. Structure 500 has rim 516 and rim 518. Feature 520 is present in body 508 of structure 500. Wall 510 has lip 522 extending towards opening 512.

Figure 6:
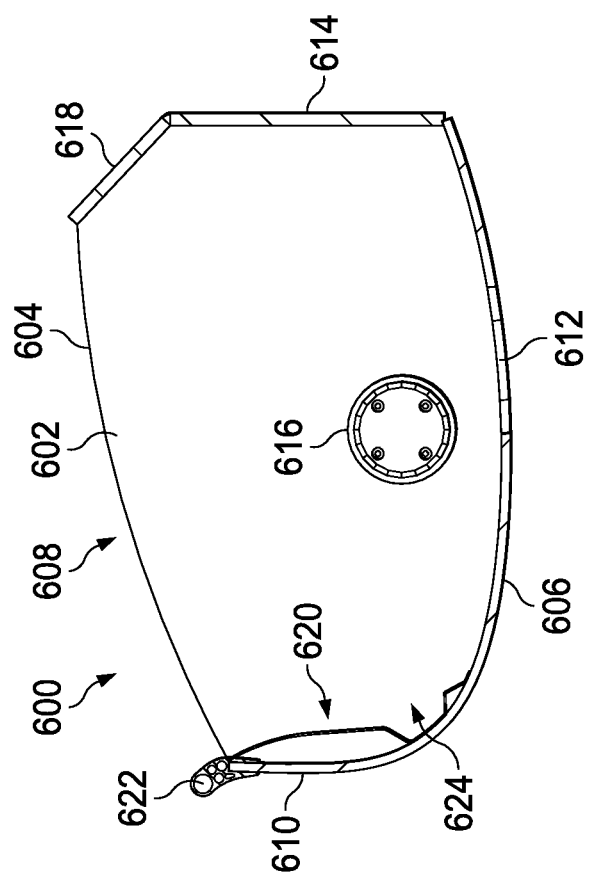
FIG. 6 is an illustration of a cross-sectional view of a structure in accordance with an illustrative embodiment.

Turning now to FIG. 6, an illustration of a cross-sectional view of a structure is depicted in accordance with an illustrative embodiment. As depicted, structure 600 is an example of a physical implementation of structure 206 shown in block form in FIG. 2 and an alternate view of structure 300 of FIG. 3.

As depicted, structure 600 has cavity 602, second side 604, J-shaped cross-section 606, and opening 608. J-shaped cross-section 606 includes flange 610, body 612, and wall 614. As depicted, second side 604 has pivot point 616. Structure 600 may rotate about an axis of rotation drawn through pivot point 616.

As depicted, pivot point 616 is located in approximately the center of the height of J-shaped cross-section 606. As a result, the axis of rotation is also located in approximately the center of the height of J-shaped cross-section 606.

Position of pivot point 616 influences the amount of force needed to put structure 600 in a closed state. As depicted, pivot point 616 is at or near the expected center of gravity for roller upright luggage held in structure 600. If pivot point 616 were moved closer to wall 614, the amount of force needed to put structure 600 in a closed state would increase.

Opening 608 is bordered by wall 614 and flange 610. Lip 618 of wall 614 extends towards cavity 602. Extension of lip 618 toward cavity 602 causes opening 608 to be smaller than the length of body 612. Lip 618 may be configured to prevent items from falling from structure 600 when structure 600 is in an open state. In one illustrative example, lip 618 is configured to prevent roller upright luggage from falling from structure 600 when structure 600 is in the open state. Lip 618 may present a physical obstacle should roller upright luggage or other items fall against or impact lip 618 while structure 600 is in an open state.

As depicted, flange 610 has shape 620 and feature 622. Shape 620 of flange 610 may deter movement of items held within structure 600 when structure 600 is in an open state. As depicted, shape 620 is configured to deter movement of roller upright luggage held within structure 600 when structure 600 is in the open state. As depicted, shape 620 includes wheel chock 624. Wheel chock 624 may receive wheels of roller upright luggage and deter movement of the wheels when structure 600 is in the open state. Wheel chock 624 may also retain roller upright luggage in structure 600 by encouraging roller upright luggage in an upright or substantially upright position to lean against body 612 when structure 600 is in an open state.

Feature 622 is associated with a formation when structure 600 is in a closed state. In one illustrative example, feature 622 may be a latching mechanism to secure structure 600 in a closed state. In another illustrative example, feature 622 may be a cushion to seal structure 600 against a formation in a closed state.

Figure 7:
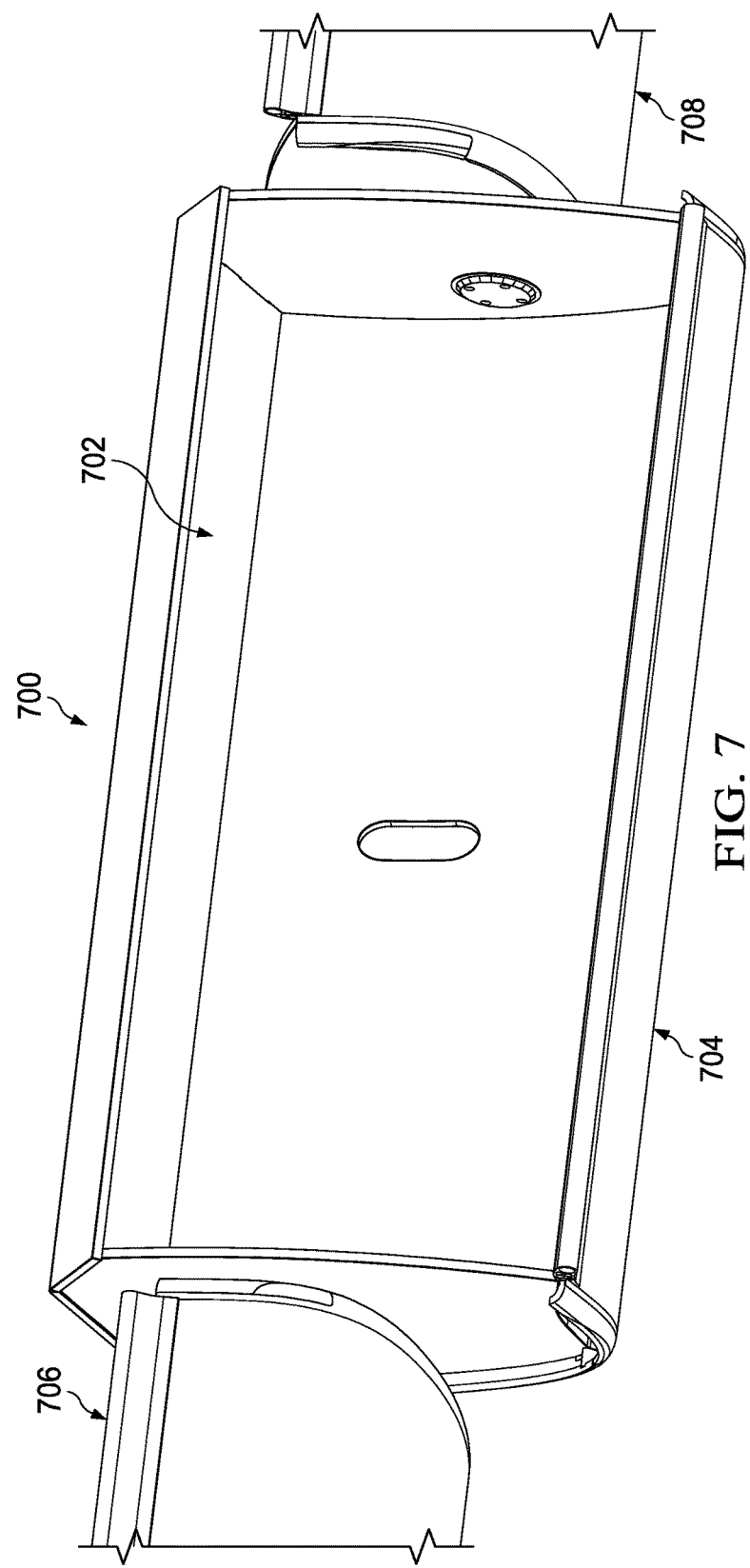
FIG. 7 is an illustration of a formation with a structure in an open state in accordance with an illustrative embodiment.

With reference now to FIG. 7, an illustration of a formation with a structure in an open state is depicted in accordance with an illustrative embodiment. As depicted, formation 700 is an example of a physical implementation of formation 202 shown in block form in FIG. 2.

As depicted, formation 700 has cavity 702. Cavity 702 is configured to receive structure 704. Structure 704 may be a physical implementation of structure 206 of FIG. 2. As depicted, structure 704 is an example of structure 300 of FIG. 3.

Structure 704 is positioned in cavity 702 so that structure 704 may rotate between an open state and a closed state. Structure 704 is depicted in an open state. In an open state, structure 704 is configured to receive items.

Structure 704 may be placed in a closed state by rotating structure 704 about an axis of rotation. Structure 704 may be placed in a closed state by application of force to structure 704 by a user or by an actuator.

Structure 706 and structure 708 are positioned on either side of structure 704. In one illustrative example, structure 706 and structure 708 may be the same design as structure 704. In other words, structure 706 and structure 708 may have the same features and characteristics as structure 704. In this illustrative example, structure 704, structure 706, and structure 708 may all be examples of structure 300 of FIG. 3. In another illustrative example, structure 704 may be different than either or both structure 706 and 708.

Structure 706 and structure 708 are depicted in a closed state. In a closed state, structure 706 is configured to hold any items which may have been previously placed in structure 706 when structure 706 was in an open state. Likewise, structure 708 is configured to hold any items which may have been previously placed in structure 708 when structure 708 was in an open state.

Figure 8:
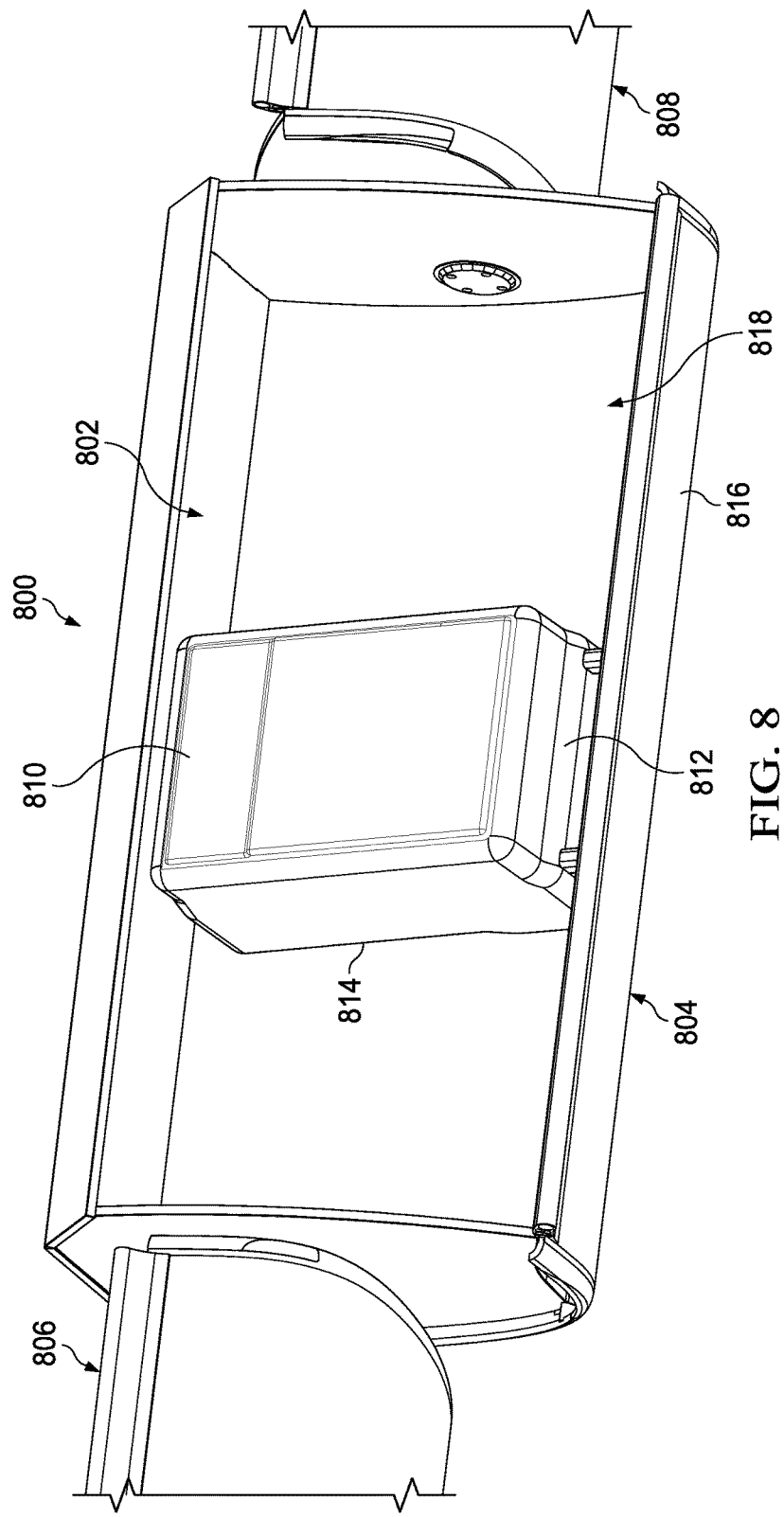
FIG. 8 is an illustration of a formation with a structure in an open state containing luggage in accordance with an illustrative embodiment.

With reference now to FIG. 8, an illustration of a formation with a structure in an open state containing luggage is depicted in accordance with an illustrative embodiment. Formation 800 is a depiction of formation 700 of FIG. 7.

As depicted, formation 800 has cavity 802. Cavity 802 is configured to receive structure 804. Structure 804 is positioned in cavity 802 so that structure 804 may rotate between an open state and a closed state. Structure 804 is depicted in an open state. Structure 806 and structure 808 are positioned on either side of structure 804. Structure 806 and structure 808 are depicted in a closed state.

As depicted, luggage 810 is present in structure 804. In this illustrative example, luggage 810 is a roller upright. As depicted, luggage 810 is present in structure 804 in an inclined state. Luggage 810 has base 812 and back 814. Flange 816 of structure 804 supports base 812. Back 814 of luggage 810 rests against body 818 of structure 804.

Structure 804 receiving luggage 810 in an inclined state may be desirable because of at least one of passenger comfort and passenger safety. By placing luggage 810 into structure 804 in an inclined state, luggage 810 need not be rotated to a horizontal position prior to placement. As a result, luggage 810 may protrude into the aisle less or not at all during placement of luggage 810. Further, placing a piece of luggage in a horizontal state may require greater exertion and effort to lift or position the luggage.

Figure 9:
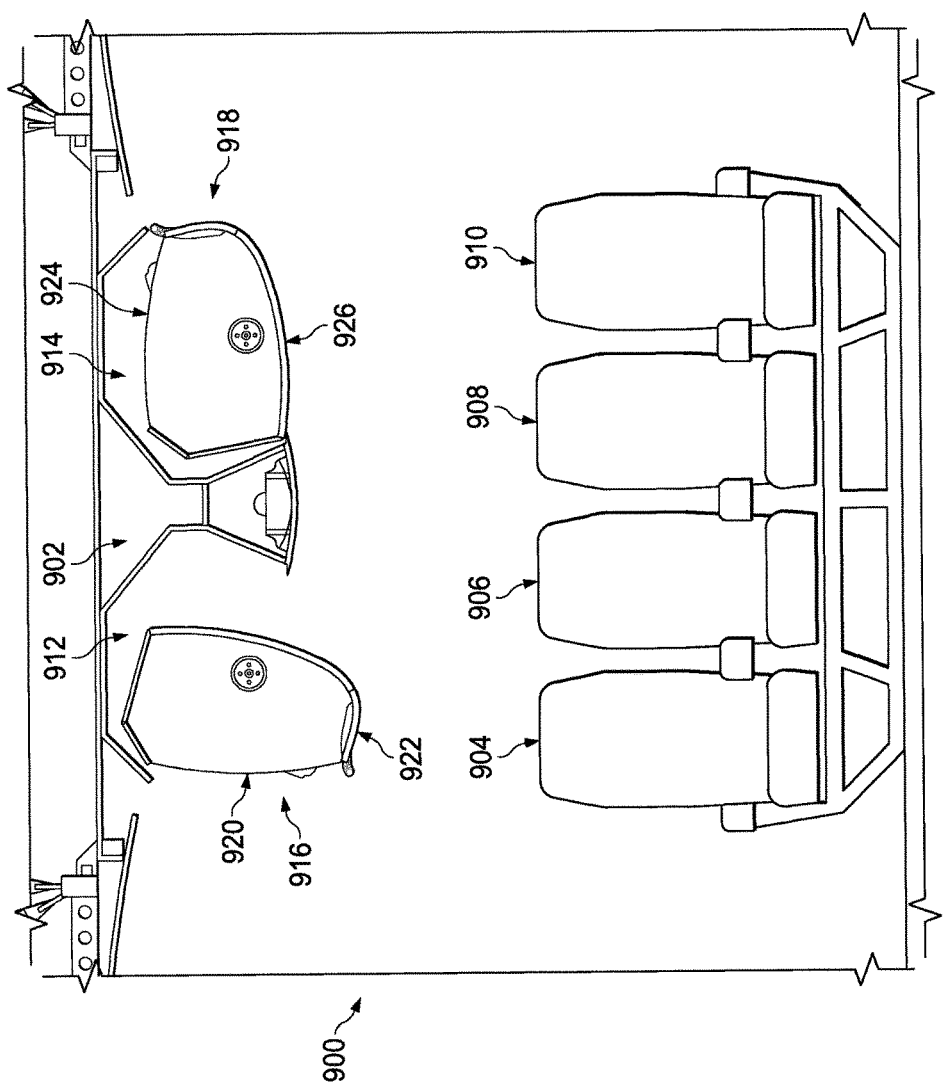
FIG. 9 is an illustration of a cross-sectional view of a structure installed in an aircraft passenger cabin in accordance with an illustrative embodiment.

With reference now to FIG. 9, an illustration of a cross-sectional view of a structure installed in an aircraft passenger cabin is depicted in accordance with an illustrative embodiment. Aircraft cabin 900 may be a physical implementation of platform 200 shown in block form in FIG. 2.

As depicted, aircraft cabin 900 has center section 902 and seats 904, 906, 908, and 910. Center section 902 has cavity 912 and cavity 914. Although in this illustrative example cavity 912 and cavity 914 are depicted as mirror images of each other, cavity 912 and cavity 914 need not have the same or similar shapes. In some illustrative examples, cavity 912 may have a different and unrelated shape to cavity 914.

Cavity 912 is configured to receive structure 916. Cavity 914 is configured to receive structure 918. In this illustrative example, structure 916 and structure 918 are identical. However, structure 916 and structure 918 need not be the same. In one illustrative embodiment, structure 916 and structure 918 may comprise different shapes.

As depicted, structure 916 is in an open state while structure 918 is in a closed state. As can be seen in this illustration, the J-shaped cross-section of structure 916 is nearly vertical. In other words, opening 920 of structure 916 is nearly perpendicular to the floor of aircraft cabin 900. As used herein, this may be referred to as opening 920 having a vertical position. This may also be referred to as structure 916 having a vertical position.

While structure 916 is in an open position, items may be placed in structure 916 through opening 920. Items placed in structure 916 may rest on flange 922 while structure 916 is in an open state.

As can be seen, in the closed state, the J-shaped cross-section of structure 918 is nearly horizontal. In other words, opening 924 of structure 918 is nearly parallel with the floor of aircraft cabin 900. As a result, a roller upright held in 918 would rest on its back, against body 926 of structure 918. As used herein, this may be referred to as opening 924 having a horizontal position.

Figure 10:
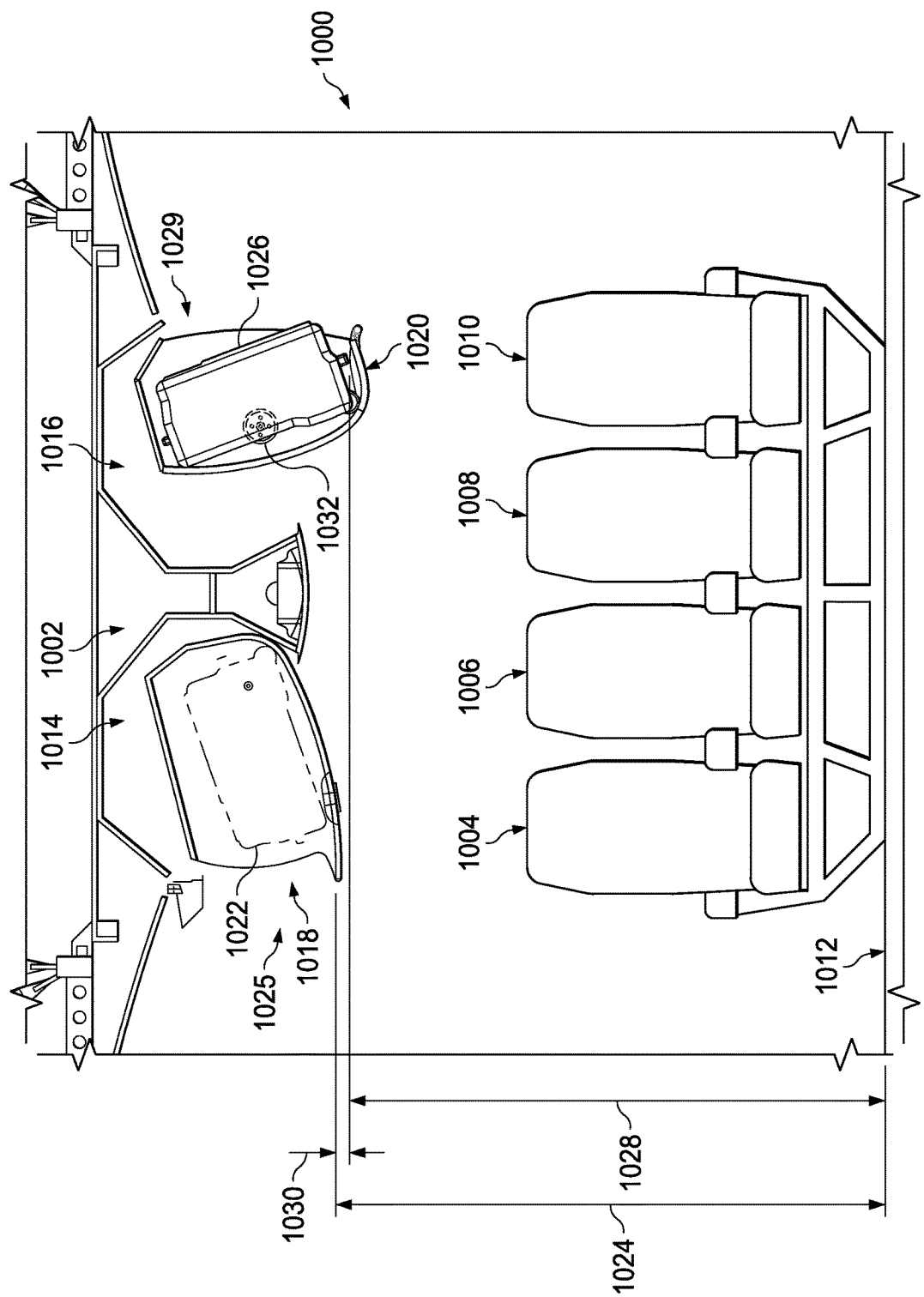
FIG. 10 is an illustration of a cross-sectional view of a structure installed in an aircraft passenger cabin in accordance with an illustrative embodiment.

With reference now to FIG. 10, an illustration of a cross-sectional view of a structure installed in an aircraft passenger cabin is depicted in accordance with an illustrative embodiment. Aircraft cabin 1000 may be a physical implementation of platform 200 shown in block form in FIG. 2.

As depicted aircraft cabin 1000 has center section 1002, seats 1004, 1006, 1008, and 1010, and floor 1012. Center section 1002 has cavity 1014 and cavity 1016. Cavity 1014 is configured to receive conventional luggage bin 1018. Cavity 1016 is configured to receive structure 1020.

Conventional luggage bin 1018 is an example of a C-shaped luggage bin. Conventional luggage bin 1018 is depicted with roller upright 1022 in a "wheels back" position. Conventional luggage bin 1018 has threshold 1024. Threshold 1024 is the distance from the lowest point of opening 1025 of conventional luggage bin 1018 in an open state to floor 1012.

Structure 1020 is depicted with roller upright 1026 in an upright position. Structure 1020 has threshold 1028. Threshold 1028 is the distance from the lowest point of opening 1029 of structure 1020 in an open state to floor 1012. As can be seen, threshold 1028 is less than threshold 1024 by difference 1030. Lower threshold 1028 of structure 1020 may cause placing items into structure 1020 to be easier, safer, or more comfortable for passengers than placing items in conventional luggage bin 1018.

Threshold 1028 may result from at least one feature of the design of structure 1020. In one illustrative example, threshold 1028 may result from the configuration or placement of pivot point 1032 and the resulting axis of rotation of structure 1020. In another illustrative example, threshold 1028 may result from the cross-sectional shape of structure 1020.

Figure 11:
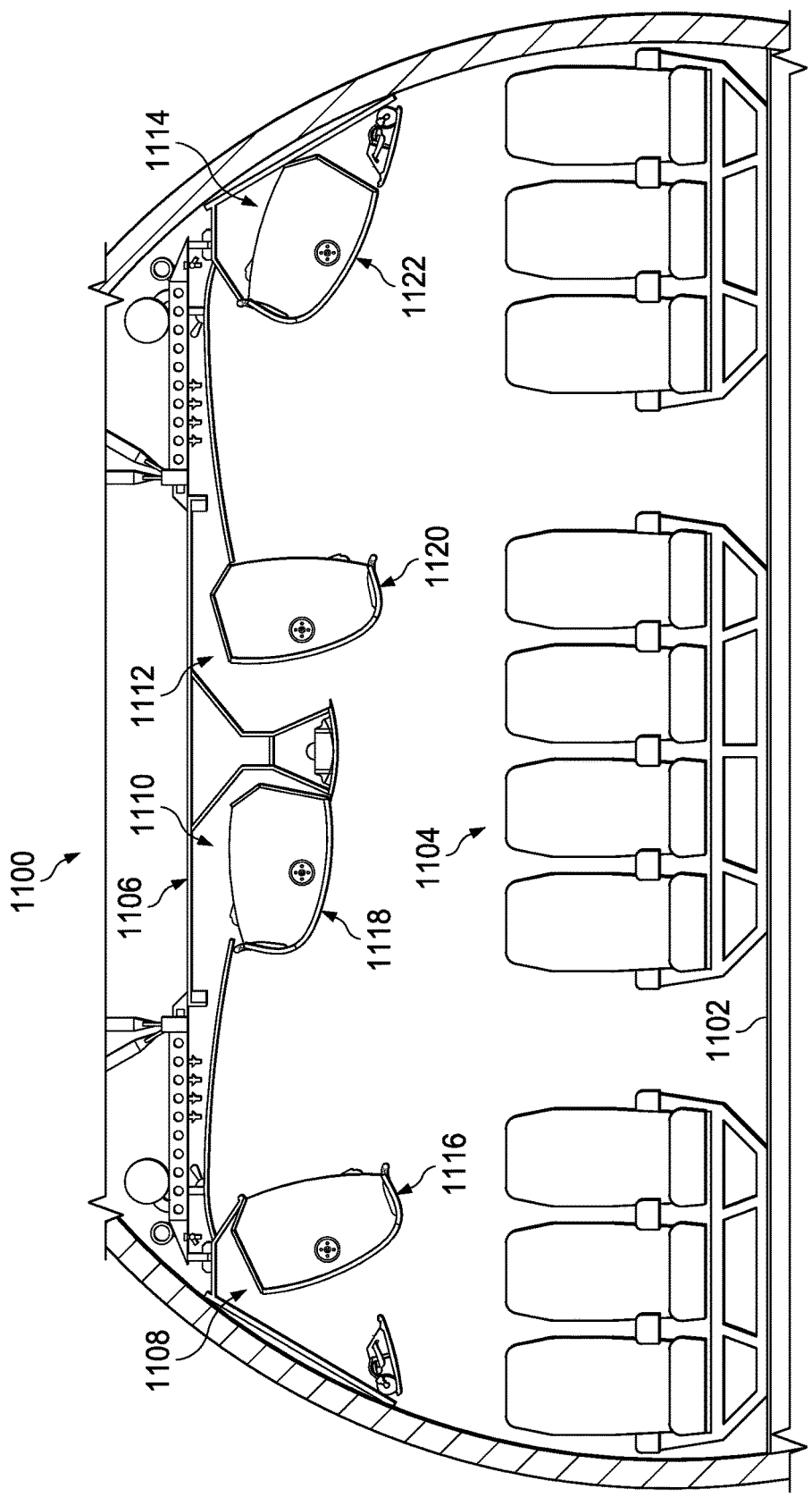
FIG. 11 is an illustration of a cross-sectional view of a structure installed in an aircraft passenger cabin in accordance with an illustrative embodiment.

With reference now to FIG. 11, an illustration of a cross-sectional view of a structure installed in an aircraft passenger cabin is depicted in accordance with an illustrative embodiment. Aircraft cabin 1100 may be a physical implementation of platform 200 shown in block form in FIG. 2.

Aircraft cabin 1100 includes aircraft floor 1102, number of seats 1104, and ceiling 1106. Ceiling 1106 has cavity 1108, cavity 1110, cavity 1112, and cavity 1114. Cavity 1108, cavity 1110, cavity 1112, and cavity 1114 are configured to receive structure 1116, structure 1118, structure 1120, and structure 1122 respectively.

As depicted, structure 1116, structure 1118, structure 1120, and structure 1122 are identical. By having the same design, structure 1116, structure 1118, structure 1120, and structure 1122 may be more economical than conventional overhead compartments. For example, as structure 1116, structure 1118, structure 1120, and structure 1122 have the same design, a smaller number of replacements may be kept in storage. By structure 1116, structure 1118, structure 1120, and structure 1122 having the same design, a replacement taken from storage may be used to replace any of structure 1116, structure 1118, structure 1120, and structure 1122. If structure 1116, structure 1118, structure 1120, and structure 1122 had different designs, replacements for each of the designs would be kept in storage, potentially increasing the number of stored replacements.

However, structure 1116, structure 1118, structure 1120, and structure 1122 need not be identical. In some illustrative examples, at least one of structure 1116, structure 1118, structure 1120, and structure 1122 has a different design or a different shape than the remaining structures.

As depicted, structure 1116 and structure 1122 are positioned in cavity 1108 and cavity 1114 on either side of aircraft cabin 1100. Structure 1118 and structure 1120 are positioned in cavity 1110 and cavity 1112 in the center of aircraft cabin 1100. As a result of being positioned on the sides of aircraft cabin 1100, structure 1116 and structure 1122 may have different angles in an open state and a closed state than structure 1118 and structure 1120.

For example, structure 1116 and structure 1120 are depicted in an open state. Structure 1116 and structure 1120 appear to be positioned at the same angle relative to aircraft floor 1102. However, the angle of structure 1116 relative to aircraft floor 1102 may be different than the angle of structure 1120 relative to aircraft floor 1102.

Structure 1118 and structure 1122 are depicted in the closed state. Structure 1118 and structure 1122 appear to be positioned at different angles relative to aircraft floor 1102.

Further, as a result of being positioned on the sides of aircraft cabin 1100, structure 1116 and structure 1122 may rotate a greater amount than structure 1118 and structure 1120. In other words, the degree of rotation between the open state and the closed state may be greater for structure 1116 and structure 1122 than for structure 1118 and structure 1120.

The different components shown in FIG. 1 and FIGS. 3-11 may be combined with components in FIG. 2, used with components in FIG. 2, or a combination of the two. Additionally, some of the components in FIG. 1 and FIGS. 3-11 may be illustrative examples of how components shown in block form in FIG. 2 can be implemented as physical structures.

Figure 12:
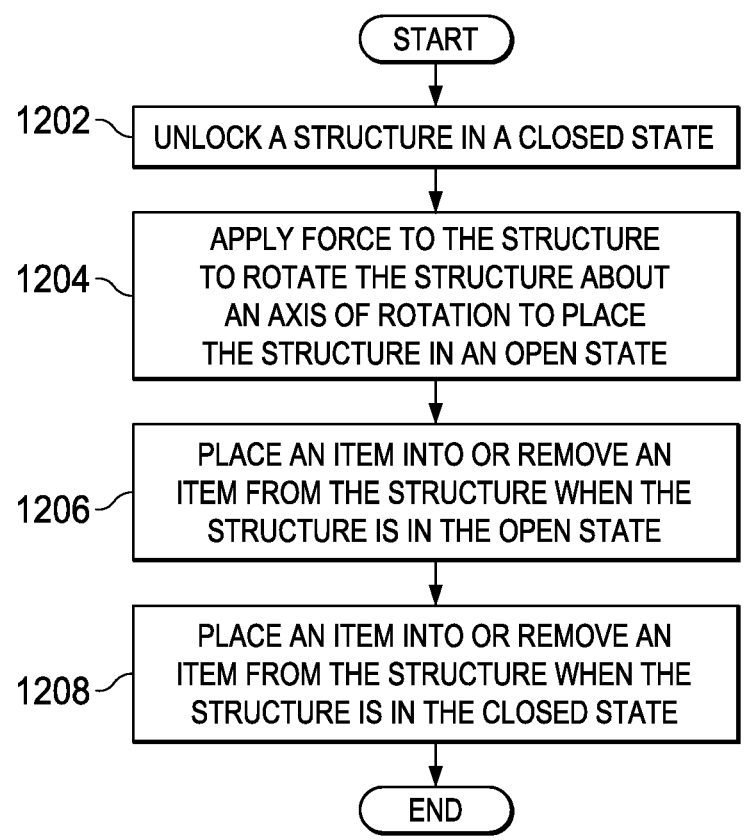
FIG. 12 is an illustration of a flowchart of a process for moving a structure between an open and a closed state in accordance with an illustrative embodiment.

Turning now to FIG. 12, a flowchart of a process for moving a structure between an open and a closed state is depicted in accordance with an illustrative embodiment. In this illustrative example, process 1200 in FIG. 12 may be implemented in platform 200 using structure 206 in FIG. 2.

The process begins by unlocking a structure in a closed state (operation 1202). A structure may be locked by a latch or other suitable mechanism while in a closed state. The structure may be unlocked by lifting the latch or likewise actuating another suitable mechanism. Next, a force is applied to the structure to rotate the structure about an axis of rotation and to place the structure in an open state (operation 1204). A force may be applied by a passenger or by a mechanism. The mechanism may include an actuator or other suitable mechanism to apply a force to the structure. When the structure is in an open state, an item is placed into or removed from the structure (operation 1206). A force is then applied to the structure to rotate the structure about an axis of rotation and place the structure into a closed state (operation 1208).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1202 and operation 1204 may be combined into one operation in which the structure is unlocked and a force is applied to rotate the structure about an axis of rotation. As another example, if the structure is already in an open state, operation 1202 and operation 1204 may not be executed.

Figure 13:
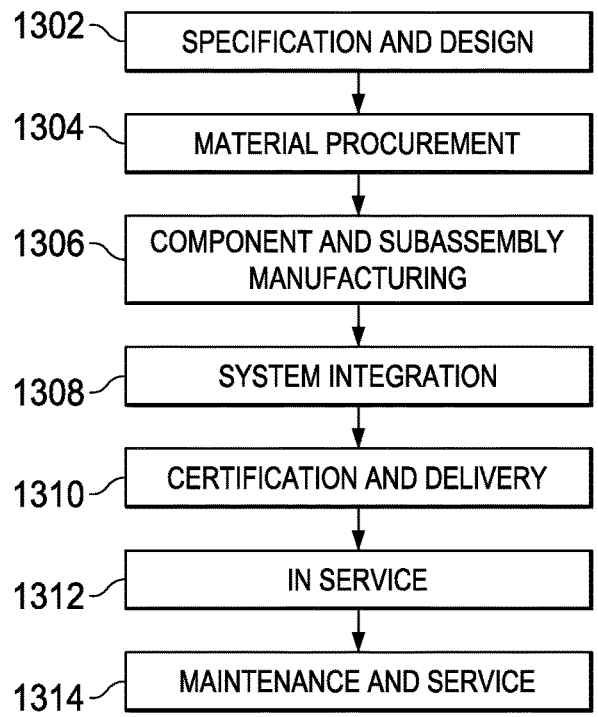
FIG. 13 is an illustration of an aircraft manufacturing and service method in accordance with an illustrative embodiment.
Figure 14:
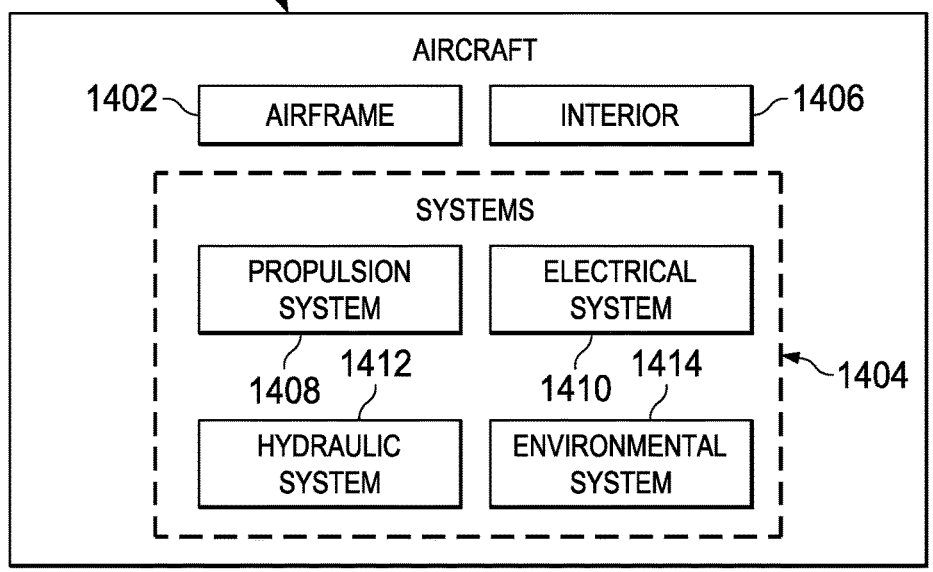
FIG. 14 is an illustration of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. One or more illustrative embodiments may be used during component and subassembly manufacturing 1306. For example, structure 206 in FIG. 2 may be used during component and subassembly manufacturing 1306. Further, structure 206 may also be used to perform replacements during maintenance and service 1314. For example, aircraft 1400 may be inspected during scheduled maintenance for aircraft 1400.

Thus, one or more illustrative embodiments may provide a method and apparatus for storing items. In particular, the illustrative embodiments may provide a structure which rotates about an axis of rotation a greater number of degrees than conventional overhead compartments. Additionally, in the illustrative embodiments, lower thresholds than conventional overhead compartments may be achieved.

The illustrative embodiments may be used to receive luggage such as upright roller luggage in an upright position. One or more illustrative embodiments may provide features to deter movement of items within structure 206. Further, one or more illustrative embodiments may provide features to prevent items from falling from structure 206 when structure 206 is in an open position.

Further, the axis of rotation may be located relative to a volume center of gravity of a structure such that a force for moving the structure to a closed state has a desired level. As a result, the structure may be configured to hold more or heavier items than conventional overhead compartments.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a structure having a cavity with an opening configured to receive a piece of baggage, wherein the structure has a J-shaped cross-section configured to receive the piece of baggage in an upright position relative to gravity; and
   the structure comprising a body and a flange that curves inwardly relative to the body, wherein the flange is configured to retain the piece of baggage when the structure is in an open state, wherein the structure is configured to move between the open state and a closed state about an axis of rotation for the structure, wherein the opening has a horizontal position when the structure is in the closed state and the opening has a vertical position when the structure is in the open state, and wherein the flange further comprises a wheel chock configured to retain a roller of the piece of baggage and further to urge the piece of baggage to lean against the body in the upright position.

2. The apparatus of claim 1, wherein the axis of rotation is located relative to a volume center of gravity of the structure, and wherein moving the structure about the axis of rotation to the closed state requires a desired level of force.

3. The apparatus of claim 1, wherein the structure having the cavity with the opening is configured to receive the piece of baggage in a substantially vertical position when the structure is in the open state.

4. The apparatus of claim 3, wherein the flange has a shape configured to engage at least a portion of a number of features on the piece of baggage, the piece of baggage having the number of features on a side of the piece of baggage resting on the flange when the piece of baggage is located in the structure in the open state.

5. The apparatus of claim 1, wherein the structure holds the piece of baggage in a substantially horizontal position when the structure is in the closed state.

6. The apparatus of claim 1, wherein the structure is a luggage bin.

7. The apparatus of claim 1, wherein the axis of rotation is configured to be approximately a center of gravity for a roller upright held in the structure.

8. The apparatus of claim 1, wherein the axis of rotation is located in approximately a center of a height of the J-shaped cross-section.

9. The apparatus of claim 1, wherein the J-shaped cross-section further comprises a wall.

10. The apparatus of claim 9, wherein the flange is configured to deter movement of the piece of baggage held within the structure when the structure is in the open state.

11. The apparatus of claim 9, wherein the wall is configured to prevent falling of the piece of baggage from the structure when the structure is in the open state.

12. The apparatus of claim 1 further comprising:

a mechanism configured to allow rotation of the structure between sixty and one hundred and twenty degrees about the axis of rotation.

13. The apparatus of claim 1, wherein the structure moves between the open state and the closed state by force applied by at least one of a user and an actuator.

14. The apparatus of claim 1, wherein the opening is nearly perpendicular to a ground in the open state.

\* \* \* \* \*